June 23, 1964  R. E. SCOTT ETAL  3,138,748
SERVO COMPUTER SYSTEMS
Filed Jan. 4, 1960

ROBERT E. SCOTT
JOHN PAUL KEMMER
*INVENTORS.*

BY

*Lyon & Lyon*

ATTORNEYS.

United States Patent Office 3,138,748
Patented June 23, 1964

3,138,748
SERVO COMPUTER SYSTEMS
Robert E. Scott, Los Angeles, and John Paul Kemmer, Woodland Hills, Calif., assignors, by mesne assignments, to Litton Industries, Inc., Beverly Hills, Calif., a corporation of Delaware
Filed Jan. 4, 1960, Ser. No. 379
9 Claims. (Cl. 318—28)

The present invention relates to improvements in servo systems and more specifically to means and techinques for the elimination of errors in such systems.

Usually a system of this type includes a servo motor which positions the tap on a potentiometer-type resistance in accordance with the difference between an input signal and a feedback voltage derived from said tap. It is oftentimes desirable in such systems that the tap be positioned or moved in a linear relationship with respect to the intensity of the input signal. In a typical servo computer the input signal includes some error component and the feedback voltage developed at the tap equalizes the input signal together with its error component. Also, any non-linearity or non-conformity in the feedback potentiometer or other feedback element causes the introduction of other errors with the net result that the tap is not positioned or moved in a linear relationship with respect to the intensity of the input signal.

The present invention as disclosed herein involves the derivation of a second feedback voltage which is so calibrated with respect to movement of the servo motor and which is applied together with the previously mentioned feedback voltage and input signal to an unbalanced detecting circuit for producing linear or substantially linear movement of positioning of the tap in accordance with the intensity of the input signal.

It is therefore an object of the present invention to provide improved means and techniques for accomplishing the above indicated results.

Another object of the present invention is to provide an improved servo system of this character that incorporates a second potentiometer resistance having its tap moved or positioned by the servo motor with different adjustable voltage sources connected to different fixed taps on such potentiometer resistance to provide a compensatory effect for non-linear conditions in the system whereby positioning or movement of the primary tap bears a linear or very linear relationship to the intensity of the input signal.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
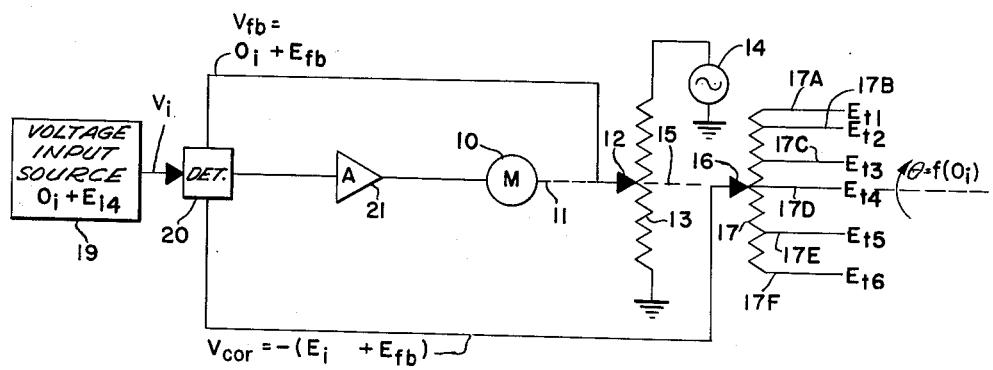
FIGURE 1 illustrates a servo system embodying features of the present invention.

Referring to the drawings, the servo system shown in FIGURE 1 includes a conventional servo motor 10 having its output shaft mechanically coupled as indicated by the dashed line 11 to the movable tap 12 of the potentiometer resistance 13. One terminal of resistance 13 is connected to the ungrounded terminal of A.C. source 14, the other terminal of resistance 13 being grounded.

The output shaft of the motor 10 is also mechanically coupled as indicated by the dotted line 15 to the movable tap 16 of resistance 17 which has also fixed taps 17A–17F both inclusive for supplying calibrated voltages by, for example, the means described later in connection with FIGURE 2.

The servo motor 10 is energized and positioned in accordance with voltages derived from three different sources, namely the source of input voltage 19, the voltage on tap 12 and the voltage on tap 16, all of such three voltages being compared in the unbalanced detecting circuit 20 which functions to produce a resultant unbalance voltage that is applied to the conventional servo amplifier 21. The output voltage of the amplifier 21 serves to drive the servo motor 10, and when, of course, the output voltage of the amplifier 21 is substantially zero, the taps 12 and 16 driven thereby remain stationary.

As shown in FIGURE 1, the tap 16 is adjacent the fourth stationary tap, namely tap 17D, but it will readily be understood that the voltage developed at tap 16 when not directly upon one of the fixed taps 17A–17F will be a voltage intermediate that of the two taps between which tap 16 is positioned, varying in accordance with such intermediate position.

Considering now the operation of the circuit thus described, the symbol V will be to describe a generalized signal appearing in the circuit, the symbol O an error-free signal, the symbol E an error signal or the erroneous component of a signal, and the symbol $\theta$ a shaft angle or position. Appropriate subscripts will be appended to each of these symbols identifying its point of appearance in the circuit.

Thus the input signal $V_i$, in addition to $O_i$ includes some error represented by $E_i$. The feedback voltage $V_{fb}$ developed on the tap 12 is represented by $O_i + E_{fb}$, the latter voltage component being a measure of the non-linearity or non-conformity error in the feedback potentiometer 13 or other feedback element. The compensating voltage $V_{cor}$ developed on the tap 16 is designated as $E_t$ which is equal to $-(E_i + E_{fb})$. This latter voltage $E_t$, a compensating voltage, is derived using the circuit shown in FIGURE 2.

Figure 2:
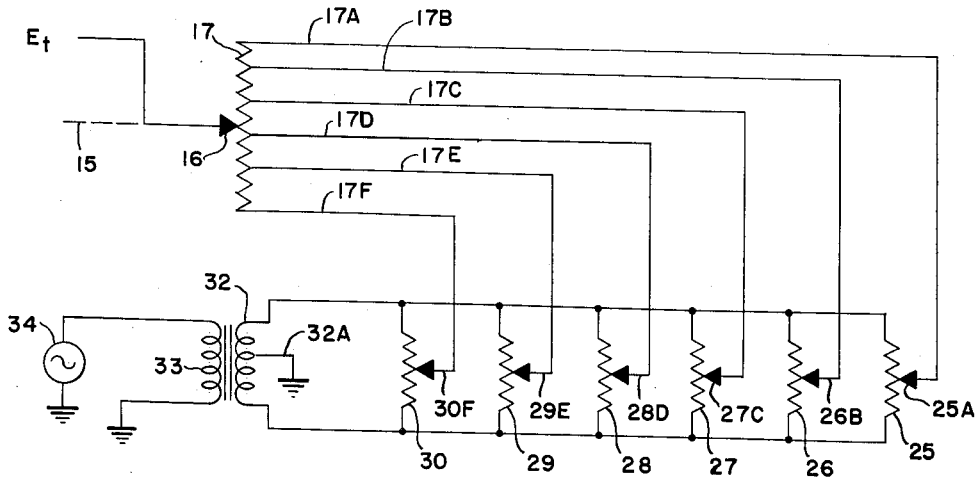
FIGURE 2 illustrates the means used in supplying the calibrating voltages to the calibration potentiometer shown in FIGURE 1.

In FIGURE 2, the fixed taps 17A–17F both inclusive are connected respectively to movable or adjustable taps 25A, 26B, 27C, 28D, 29E and 30F of corresponding resistances 25–30 both inclusive which have their outside terminals connected to corresponding outside terminals of the secondary winding 32 having its center tap 32A grounded. The primary winding 33 has one of its terminals grounded and the other one of its terminals connected to the ungrounded terminal of the A.C. source 34. By these means, the individual voltages on fixed taps 17A, 17F both inclusive may be individually adjusted to achieve the desired value of $E_t$ at any one of the positions of the motor driven tap 16. This adjustment is so made that errors $E_i$ in the input signal and the error signal $E_{fb}$ resulting from non-linear conditions in the servo system are compensated throughout the range of movement of the taps 12 and 16 such that movement or positioning $\theta_0$ of the tap 12 and tap 16 is exactly representative of the input signal less its error, i.e. $O_i$.

Thus the addition of the second feedback potentiometer 17 which is tapped at any desired number of calibration points allows the repeatable portion of the error signals to be removed at each calibration point. The correction signal varies linearly between each calibration point, thereby eliminating nearly all of the error caused by any smooth or continuous error curve in the feedback and input elements.

In other words, the correction signals, representing the total error at each calibration point, are applied to taps on the calibration potentiometer 17 in such a manner that when the input is set to a certain calibration point, the signal from the calibration potentiometer 17 is equal to the input and feedback errors at that point. The error signals and the correction signals now cancel when the output $\theta_0$ exactly represents $O_i$.

The calibrating signals required at each of the five calibrating points are obtained by adjustment of the corresponding trimmer potentiometers 25-30 both inclusive to give a minimum of output error when the input quantity is simulated for each calibration point in turn. While the circuit may be regarded as completely error free when tap 16 is positioned directly upon one of taps 17A-17F, the circuit will also be substantially error free for any other setting of tap 16.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a servo system incorporating an unbalance detecting circuit responsive to an input signal and a feedback signal for positioning a first element which establishes the value of said feedback signal, means for coupling said unbalance detecting circuit to a second element which derives a corrective voltage according to the position of said first element, and means for applying said corrective voltage together with said input signal and feedback signal to said detecting circuit for obtaining a linear variation between said input voltage and the position of said first element.

2. In a servo system incorporating an unbalance detecting circuit responsive to an input signal and a feedback signal for positioning a first element which establishes the value of said feedback signal, a second element positioned simultaneously with said first element for establishing the value of a corrective signal in accordance with the position of said second element, and means applying simultaneously said input signal, said feedback signal and said corrective signal to said unbalance detecting circuit.

3. In a servo system, the combination comprising a servo motor, an unbalance detecting circuit responsive to a plurality of voltages and functioning to derive an output voltage as a result of said plurality of voltages, means applying said output voltage to said servo motor, a first and a second potentiometer resistance each having a corresponding tap mechanically coupled to said motor for movement and positioning thereby, means deriving a feedback voltage on the tap of said first resistance and applying the same to said unbalance detecting circuit, means deriving a corrective voltage and applying the same through the tap on said second resistance to said unbalance detecting circuit, a source of input signal coupled to said unbalance detecting circuit, said unbalance detecting circuit functioning to compare the input signal, said feedback signal and said corrective voltage and to produce a resultant which is applied to said motor to position said taps in accordance therewith.

4. A servo system as set forth in the preceding claim in which said second potentiometer has a plurality of fixed taps thereon and means for individually adjusting the voltage on each of said fixed taps.

5. A servo system as set forth in the preceding claim in which the last mentioned means comprises a series of potentiometers each energized from a common source and each having a corresponding tap thereon connected to a corresponding one of said fixed taps.

6. A substantially error-free servo system for receiving an applied input signal and positioning an output shaft in accordance therewith comprising: an electrical servo motor having an input circuit and an output shaft; first and second means for producing first and second output signals which are each different continuous functions of the position of said output shaft; and an unbalance detecting circuit simultaneously responsive to an applied input signal and said first and second output signals for applying a signal to the input circuit of said motor to drive the output shaft of said motor to a position corresponding to said input signal.

7. The servo system set forth in claim 6, wherein said first output signal produced by said first means is a substantially linear function of the position of said output shaft, and including means for adjusting the functional relationship between the position of said output shaft and said second output signal.

8. The servo system set forth in claim 6, wherein said first output signal produced by said first means is a substantially linear function of the position of said output shaft, and said second means includes means for establishing one and another continuous functional relationship between the position of said output shaft and said second output signal over one and another range of positions of said output shaft.

9. A substantially error-free servo system for receiving an applied input signal and positioning an output shaft in accordance therewith comprising: an electrical servo motor having an input circuit and an output shaft; first means for producing a first output signal which is a substantially linear function of the position of said output shaft; an unbalance detecting circuit for receiving said first output signal, a corrective signal and an applied input signal which is a representation of a physical value and producing an output signal to drive said motor to a position corresponding to said physical value, and means coupled to said output shaft for producing said corrective signal as a function of the position of said shaft, whereby said shaft is driven to a position corresponding to said physical value.

References Cited in the file of this patent

UNITED STATES PATENTS

| | | |
|---|---|---|
| 2,455,364 | Hays | Dec. 7, 1948 |
| 2,511,863 | McCoy | June 20, 1950 |
| 2,783,421 | Hering | Feb. 26, 1957 |
| 2,812,485 | Shieber | Nov. 5, 1957 |
| 2,814,767 | Gray | Nov. 26, 1957 |
| 2,950,429 | Berry | Aug. 23, 1960 |